Figure 1:
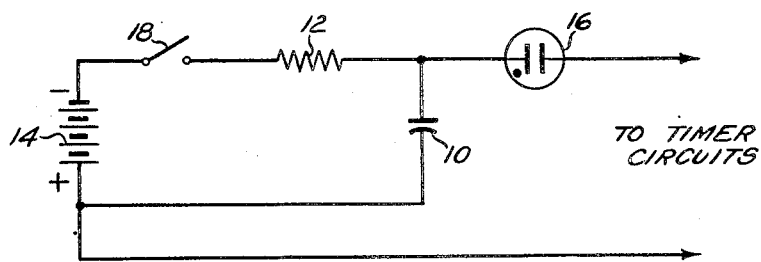

April 18, 1950     W. J. KUNZ, JR     2,504,848
RESISTANCE MEASURING APPARATUS
Filed Nov. 16, 1945

INVENTOR
WILLIAM J. KUNZ JR.
BY Robert J. Killman
ATTORNEY

Patented Apr. 18, 1950

2,504,848

UNITED STATES PATENT OFFICE 2,504,848

RESISTANCE MEASURING APPARATUS

William J. Kunz, Jr., Baltimore, Md., assignor to Bendix Aviation Corporation, South Bend, Ind., a corporation of Delaware Application November 16, 1945, Serial No. 629,049

9 Claims. (Cl. 175—183)

This invention relates to means for measuring resistances and more particularly to equipment of this type adapted for high resistance measurements in production testing. Use is made of the relation between the resistance in an R-C circuit and the time required to charge the associated capacitor to a desired voltage, when connected to a D. C. source.

The Wheatstone bridge is most frequently employed for the accurate determination of resistances. However, the use of such bridges for measurements is attended by certain difficulties, when very low and very high resistances are concerned.

With low resistances, errors are introduced by lead and contact resistance. On the other hand, when the unknown resistance is very high, the bridge galvanometer becomes a relatively insensitive indicator of balance, due to the mismatch between the bridge source and the galvanometer load. The difficulty can be overcome through the application of a relatively large D. C. voltage to the bridge, together with the use of a D. C. vacuum tube voltmeter to indicate balance. However, the high voltage then present across the resistor, and the possibility of damage to the equipment through improper handling impairs its suitability for routine production testing.

The conventional voltmeter-ammeter methods fail from a practical standpoint when high resistances are to be measured by unskilled personnel, because of the delicacy of the necessarily extremely sensitive instruments.

One of the objects of the invention is the provision of a new and novel resistance measuring means, suitable for routine use by unskilled personnel.

Another object of the invention is the provision of a new and novel means for high resistance measurements, in which the indications are delivered on an elapsed time measuring device.

A further object of the invention is the provision of a new and novel means for high resistance measurements, which makes appropriate use of the time constant in an R-C circuit, formed by the resistance to be measured, and a fixed capacitor of known capacitance.

Still another object of the invention is the provision of a new and novel means for high resistance measurements through determination of the time required to charge a capacitor of known capacitance to a selected voltage.

The objects and advantages of the invention are substantially accomplished by simultaneously energizing an elapsed time meter and a condenser charging circuit including the resistor under test, and de-energizing the elapsed time-meter, when the condenser voltage reaches a predetermined value.

Figure 2:
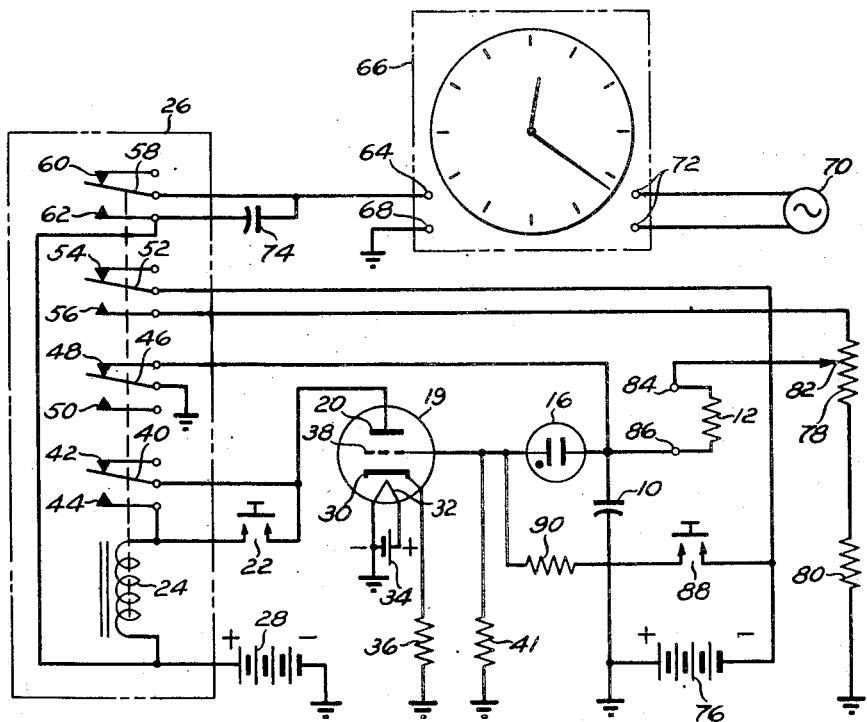

Other objects and advantages of the invention will in part be disclosed and in part be obvious when the following specification is read in conjunction with the drawings in which:

Figure 1 is a simplified circuit, illustrating the operating principles utilized by the invention, and Figure 2 is a schematic diagram of a complete apparatus embodying the invention.

Referring now to Figure 1, when a condenser 10 and a resistor 12 are connected in series with a constant potential source of E. M. F. 14 through a switch 18, the initial flow of current into the condenser is limited by the resistance, so that a longer period of time is required to complete the charging of the condenser than would be the case without the resistor. The time required to charge the condenser is proportional to the capacity and the resistance, the product of which is called the time constant of the circuit. If a glow discharge tube 16, of the type in which an arc is established between adjacent electrodes when a critical voltage, the ignition voltage, is applied, be connected across the condenser plates in series with a load, the time required to charge the condenser to the ignition voltage of the glow discharge tube is determined by the formula:

$$T = R \cdot C \cdot \log \frac{E}{E - E_i}$$

Where:

R = resistance in ohms;
C = capacitance in farads;
E = supply voltage;
$E_i$ = ignition voltage of the glow discharge tube;
T = time in seconds.

E and $E_i$ are constants. If a fixed condenser of known capacitance is used, a linear relationship between the resistance and the charging time is established, permitting the determination of the unknown resistance from the knowledge of the charging time. This charging time may be measured through connection of suitable time-measuring apparatus, controlled by the current flowing through the discharge tube 16.

Simultaneously with the closure of switch 18, battery voltage is applied to the R-C circuit 10, 12, and the operation of the time metering mechanism is initiated. When the capacitor potential reaches the ignition voltage of the gas discharge tube 16, the tube fires and shuts off the time metering mechanism. The magnitude of the unknown resistance 12 may then be obtained by reading direct calibrations on the time measuring device, or may be read from a chart made up from the above equation relating condenser voltage, time and the resistance in the test circuit, or may be determined by a simple calculation, based on said equation.

There is provided in Figure 2 a thermionic tube 19 having its anode 20 connected through the start switch 22 and the operating winding 24 of the timer control relay 26 to the positive terminal of a suitable high voltage source, indicated at 28 and having its negative terminal grounded. The cathode 30 of tube 19 is thermally associated with the heater 32, receiving energy from the heater source 34. One terminal of the heater 32 is connected to ground while the thermionic emissive cathode 30 is connected to ground through resistor 36. Situated intermediate the anode 20 and the cathode 30 is the control grid 38, connected to one electrode of the glow discharge tube 16 and through grid leak resistor 41 to ground. As will appear in the ensuing development, the breakdown of discharge tube 16 referred to in Figure 1 is employed to control the current flow through tube 19 in a manner effecting a timing operation.

Magnetically associated with the timer control relay 26 are a plurality of movable contacts 40, 46, 52 and 58, respectively engageable with back contacts 42, 48, 54 and 60 and front contacts 44, 50, 56 and 62.

The contacts 40, 44 serve as a holding contact pair and are connected in shunt with the start switch 22. These contacts are closed by the passing of current through operating winding 24. Contacts 58 and 62 serve as a single-pole, single-throw switch and are also closed when operating winding 24 is traversed by a current flow. Contacts 58 and 62 are connected in series between the positive terminal of the source 28 and the ungrounded clutch energizing terminal 64 on the clock or timer 66. The other terminal 68 of the timer clutch energizing circuit is grounded. The clock 66 is of the type actuated by a synchronous motor energized from the A. C. source 70 connected to the terminals 72 of the timer 66. The driving motor in the timer 66 operates continuously, but propels the hands over the cooperating dial only when a voltage is impressed across terminals 64, 68 engaging clutch linking the two mechanisms. The timer 66 therefore delivers an indication equal to the duration of closure of the contacts 58 and 62. Since the clutch circuit is normally of an inductive nature, the contacts 58 and 62 are shunted by the spark-suppressing capacitor 74.

The circuit in which the resistance to be measured is inserted includes a source of substantially unidirectional voltage, indicated at 76 and having its positive terminal grounded. The negative terminal of source 76 is connected to the movable contact 52, and the mating contact 56 is connected to one terminal of the potentiometer 78 having its other terminal connected to ground through resistor 80. An adjustable tap 82, movable over resistor 78, is connected to the test terminal 84 which, with its companion 86 is adapted to receive the resistor 12 under test. Terminal 86 is connected to the terminal of the glow discharge device 16 remote from the control grid 38 and also to the back contact 48 which is grounded by movable contact 46 of the timer relay 26 in the absence of current flow through the operating winding 24. The integrating capacitor 10 is also connected between terminal 86 and ground.

Provision for de-energizing relay 26 in the absence of a test resistor is made by the insertion of a release switch 88 in series with a surge limiting resistor 90 between the negative terminal of source 76 and control grid 38 of the triode 19.

When the relay 26 is de-energized, the connections of the timer clutch 64 and tube 19 are interrupted. Moreover, the contact pair 46, 48 shorts capacitor 10 to insure that the measuring cycle always starts with no residual charge thereon.

Momentary pushing of switch 22 closes the circuit through the anode circuit of tube 19 and the operating winding 24 of relay 26. The relay then moves into the energized position and performs the following functions:

1. Relay contact pair 46, 48 separates, removing the ground from capacitor 10.
2. Relay contact pair 52, 56 closes, connecting the source 76 to the resistor network 78, 80, inserted between the battery and the actual test circuit 10, 12, for calibration purposes. The charging of capacitor 10 through resistance 12 is thus started.
3. Relay contact pair 40, 44 closes, connecting the anode 20 of tube 19 to the operating winding 24 around switch 22, holding the circuits in timing position after the opening of switch 22. Tube 19 conducts when this anode voltage is applied, and the relay is thus electrically locked into the anode circuit of tube 19. It remains closed, until the anode current is interrupted.
4. Relay contacts 58, 62 close a circuit which operates the magnetic clutch of the electric clock 66, and the clock begins to run.

The relay remains closed until the charge on condenser 10 has reached the ignition voltage of the glow discharge tube 16. At this moment the tube fires, and a negative voltage is applied to the grid 38 of tube 19 to interrupt the anode current of tube 19. The relay 26 then opens, stopping the clock or timer 66. The timing cycle is now completed, and the unknown resistance value can be read directly from the clock, if it is calibrated in ohms, or it can be easily computed.

Proper selection of the capacitance 10 in relation to the order of magnitude of the resistances to be checked, allows the choice of a timing cycle of sufficient length to secure high accuracy of the measurements. For example, resistances of the order of 30 megohms have been measured in two seconds with an accuracy of five per cent (5%). In this instance, battery 28 supplied 200 volts, battery 76, 135 volts, resistor 78 was 2 megohms and resistor 80 was 30 megohms.

The safety circuit, consisting of switch 88 and resistance 90, is connected between the battery 76 and the grid 38 of tube 19. Through operation of switch 88 a negative voltage can be applied to the grid 38 of tube 19, and the relay 26 thus be manually opened, when the device has been operated by mistake or when the resistance 12 is infinite.

The described device provides therefore a simple, practical means for the measurement of high resistances to close tolerances in short time intervals. After the initial adjustments have been made, the device operates automatically. No high voltages are present across the resistance under test, and unskilled personnel can operate the device with high accuracy of measurements and a high production rate. Moreover, the device is readily modified to cover a wide range of resistance values.

In the described device, use has been made of the linear relationship between time constant and the unknown resistance, when the capacitance of the R-C circuit is held constant. The device could be readily modified to permit resistance measurements by means of a calibrated capacitance in order to secure in all cases a predetermined time constant of the R-C circuit.

Where batteries have been illustrated as sources of potential, this has been merely for convenience in presentation, since rectified, or rectified and filtered current will, in many instances, prove as satisfactory.

It will be obvious that many changes and modifications may be made in the invention without departing from the spirit thereof as expressed in the foregoing discussion and in the appended claims.

What is claimed is:

1. In resistance measuring apparatus: a plurality of terminals adapted for connection to a resistance under test; a capacitor of predetermined value; a source of substantially constant potential; switching means connecting said capacitor and said terminals in series with said source; a time measuring device actuated substantially simultaneously with the closure of said switching means to begin the measurement of a time interval; and means responsive to potentials appearing across said capacitor to cause said time measuring device to terminate its measuring action when the potential across said capacitor reaches a predetermined value.

2. In resistance measuring apparatus: time measuring means; means connecting in series relationship a resistance under test and a capacitor of predetermined value; a source of electric energy; releasable switching means simultaneously initiating the operation of said time measuring means and connecting said series combination to said source upon closure; and means responsive to potentials appearing across said capacitor to release said switching means when the potential across said capacitor reaches a predetermined value.

3. In resistance measuring apparatus: time measuring means; means connecting in series relationship a resistance under test and a capacitor of predetermined value; a source of electric energy; a first switch controlling the operation of said time measuring means; a second switch connecting said source and said series circuit combination; said switches being linked to close and open substantially simultaneously; means for closing said switches; and means responsive to potentials appearing across said capacitor to open said switches when the potential across said capacitor reaches a predetermined value.

4. In resistance measuring apparatus: time measuring means; means connecting in series relationship a resistance under test and a capacitor of predetermined value; a source of electric energy; a first switch controlling the operation of said time measuring means; a second switch connecting said source and said series circuit combination; said switches being linked to close in a first position and open in a second position substantially simultaneously; a third switch connected in shunt with said capacitor and adapted to close while said preceding switches are open and open when said preceding switches are closed; means for placing said switches in said first position; and means responsive to potentials appearing across said capacitor to return said switches to said second position when the potential across said capacitor reaches a predetermined value.

5. In resistance measuring apparatus: time measuring means; means connecting in series relationship a resistance under test and a capacitor of predetermined value; a source of electric energy; a first switch controlling the operation of said time measuring means; a second switch connecting said source and said series circuit combination; said switches being linked to close in a first position and open in a second position synchronously; a third switch connected in shunt with said capacitor and adapted to close when said switches are in said first position and to open when said switches are in said second position; means for placing said switches in said first position; means responsive to potentials appearing across said capacitor to return said switches to said second position when the potential across said capacitor reaches a predetermined value; and manually operable means for returning said switches to said second position.

6. In resistance measuring apparatus: time measuring means; means connecting in series relationship a resistance under test and a capacitor of predetermined value; a source of electric energy; a first switch controlling the operation of said time measuring means; a second switch connecting said source and said series circuit combination; said switches being linked to operate synchronously; electro-magnetic means for actuating said switches; an electric discharge device controlling the application of energizing stimuli to said electro-magnetic means; said electric discharge device being responsive to a predetermined value of control potential applied thereto to deenergize said electro-magnetic means; and means applying to said electric discharge device as control potential the potentials appearing across said capacitor.

7. In resistance measuring apparatus: time measuring means; means connecting in series relationship a resistance under test and a capacitor of predetermined value; a source of electric energy; a first switch controlling the operation of said time measuring means; a second switch connecting said source and said series circuit combination; said switches being synchronously operable; electro-magnetic means for actuating said switches; an electric discharge device responsive to potentials applied thereto as control voltage to control the application of energizing stimuli to said electro-magnetic means; means applying the electrical potential appearing across said capacitor to said electric discharge device as control voltage when said potential reaches a predetermined value; and means for manually applying electric energy to energize said electric discharge device.

8. In resistance measuring apparatus: means connecting a resistance under test and a capacitor of predetermined value; a unidirectional test source of electric energy having its positive terminal grounded and its negative terminal connected to said impedance-capacitor combination through a normally open switch; a normally closed switch shunting said capacitor; time measuring means; means for controlling the operation of said time measuring means; a second unidirectional source of electric energy having its negative terminal grounded; a normally open switch connected between the positive terminal of said second source and the means controlling the operation of said time measuring means; an electric discharge device having a cathode, a control grid and an anode; means connecting said cathode to ground; means having a discontinuous E—I characteristic connecting said control grid to an ungrounded terminal of said capacitor; a current conducting winding having one terminal connected to said positive terminal of said second source; a normally open holding switch connected between the other terminal of said winding and said anode, said winding producing a magnetic field in response to current flow therethrough actuating said switches from their normal position; and a manually operable switch shunting said holding switch, said means having a discontinuous E—I characteristic operating upon the existence of a predetermined potential across said capacitor to apply said potential to said control electrode whereby said winding is energized and said switches actuated from their normal position.

9. In resistance measuring apparatus: time measuring means; a source of potential; an energy storing circuit including a capacitor of predetermined value and the resistance being measured, the rate of energy storage in said energy storing circuit being governed by said resistance; means for applying said potential to said circuit and simultaneously initiating the operation of said time measuring means, and means operable to disable said time measuring means, said disabling means being actuated by energy stored in said circuit in response to the application of said potential thereto, the actuation of said disabling means occurring when the energy stored in said circuit reaches a predetermined value.

WILLIAM J. KUNZ, Jr.

REFERENCES CITED

The following references are of record in the file of this patent:

UNITED STATES PATENTS

| Number | Name | Date |
|---|---|---|
| 1,844,886 | Herman | Feb. 9, 1932 |
| 1,909,471 | Kelly, Jr. | May 16, 1933 |
| 2,081,074 | Strauss | May 18, 1937 |
| 2,404,001 | Smith | July 16, 1946 |
| 2,408,727 | Blitz | Oct. 8, 1946 |

FOREIGN PATENTS

| Number | Country | Date |
|---|---|---|
| 259,048 | Great Britain | Oct. 7, 1926 |
| 551,910 | Great Britain | Mar. 15, 1943 |